June 11, 1963  F. E. ALTOZ ETAL  3,093,086
DIAPHRAGM ASSEMBLAGE
Filed April 12, 1960
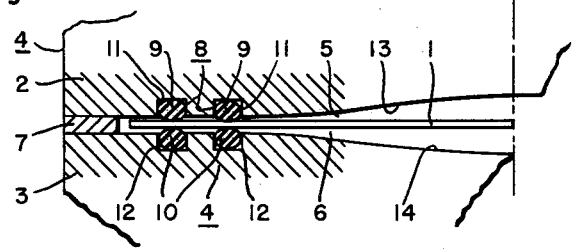
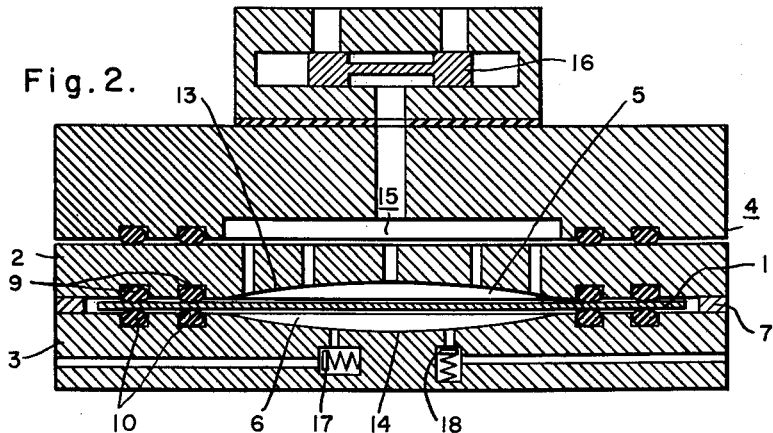
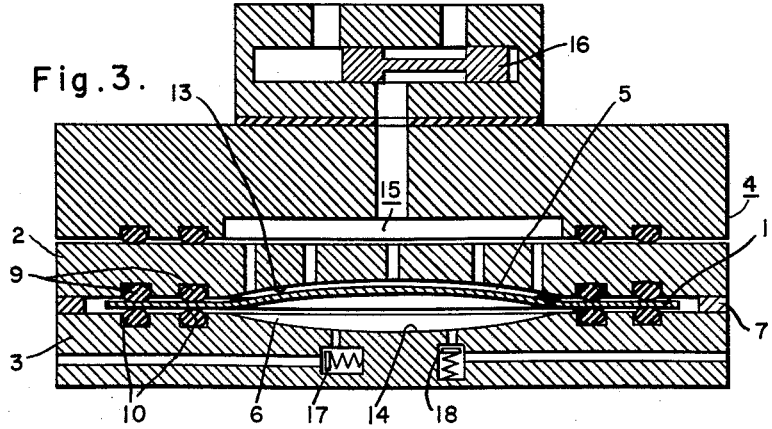
WITNESSES:
INVENTORS
Frank E. Altoz, Julian R. Eargle, Sr.
& Harold E. Almony
BY
PATENT AGENT

United States Patent Office 3,093,086
Patented June 11, 1963

3,093,086
DIAPHRAGM ASSEMBLAGE
Frank E. Altoz, Catonsville, Julian R. Eargle, Sr., Glen Burnie, and Harold E. Almony, Linthicum Heights, Md., assignors to Westinghouse Electric Corporation, East Pittsburgh, Pa., a corporation of Pennsylvania
Filed Apr. 12, 1960, Ser. No. 21,660
3 Claims. (Cl. 103—150)

The present invention relates to a diaphram assemblage and more particularly to a free-floating diaphragm assemblage.

In the field of movable abutments, for example, for effecting such as a mechanical force or a physical displacement of a member to be actuated responsively to fluid under pressure, or for effecting a fluid displacement or compression responsively to a mechanical actuation, as in mechanically actuated pumps, valves and compressors, or for effecting a fluid displacement or compression responsively to such as a fluid pressure or electro-magnetic input, as in fluid pressure operated or electrically operated pumps and compressors; it often becomes expedient to employ a flexible diaphragm adequately secured and sealed adjacent to its outer periphery, in lieu of a piston, in order to take advantage of the lesser mass, greater simplicity, and sealing facility, for example, afforded by a diaphragm.

In certain applications, flexible diaphragms of relatively hard material, such as metal, are preferred over diaphragms of resilient material. In previously known assemblages including a flexible metal diaphragm as heretofore employed, it has been the practice to rigidly clamp opposite faces of such diaphragm at its outer edge between portions of a divided casing or housing while depending upon a sealing member interposed between diaphragm and casing to prevent escape of fluid under pressure therebetween.

In such rigidly-clamped metal diaphragm assemblages the maximum deflection at the center of the diaphragm is limited due to the high induced bending stress near its clamped edge. This greatly limits the maximum extent to which such diaphragm may be deflected, hence limits the effectiveness of such diaphragm as a movable abutment. This results in the use of large diaphragms in order to obtain the necessary deflection while attempting to avoid early failure of such diaphragms.

In view of the foregoing remarks, it becomes a prime object of the present invention to provide a novel diaphragm assemblage, employing a diaphragm of metal or non-resilient material, which affords longer service life of such diaphragm at greater maximum deflection than previous diaphragms of the type, thereby effecting a size reduction in the assemblage and enhancing its use in airborne equipment.

It becomes another object of the present invention to provide an improved diaphragm assemblage in accord with the preceding object which is particularly adapted for use in a fluid pressure actuated compressor.

It is another object of the present invention to provide a novel metal diaphragm assemblage affording a greater displacement efficiency than metal diaphragm assemblages heretofore employed.

It is still another object of the present invention to proved a novel diaphragm assemblage including fluid-pressure chamber-defining means which affords an improved volumetric efficiency when employed in a pump or compressor.

Other objects and advantages of the invention will become apparent from the detailed description when taken in connection with the accompanying drawing, in which:

FIGURE 1 is a cross-sectional view of the novel diaphragm assemblage embodying the invention;

FIG. 2 is a similar view of such diaphragm assemblage as same may be embodied in a fluid-actuated compressor or pump; and FIG. 3 is a cross-sectional view of the pump or compressor of FIG. 2, showing the novel diaphragm assemblage in its fully deflected state.

Referring to FIG. 1 in the drawing, the improved diaphragm assemblage comprises a normally-flat, circular, metallic diaphragm 1 which is disposed between sections 2 and 3 of a hollow casing 4 as a deflectable abutment dividing the interior of such casing into chambers 5 and 6. The central portion of casing 4 at its interior is shaped to accommodate deflection of the diaphragm, while, in accord with a feature of the invention, the annular casing portion encasing a peripheral annular edge portion of the diaphragm may be shaped to provide clearance and/or otherwise provide freedom for radialwise movement of such diaphragm during its deflection; although it is preferable, as shown, to employ an annular spacer member 7 interposed between the casing portions to afford such freedom. The two casing portions will be clamped or secured together by any suitable means (not shown).

To afford the necessary fluid tight seal between the casing 4 and the diaphragm 1, a sealing means 8 is provided. Such sealing means preferably takes the form of two oppositely-arranged pairs of O-rings 9, 10 of resilient material (rubber, for example) accommodated in respective pairs of grooves 11, 12 formed in the casing. The section diameter size of the individual O-rings relative to groove size is chosen in accord with the degree of O-ring compression between diaphragm and casing necessary to effect the necessary sealing action while enabling the freedom for radialwise movement of the outer edge of the diaphragm. In actual test where chamber 5, 6 pressures in the neighborhood of 2,000 p.s.i. were in existence, an O-ring section diameter compression of .002 inch was found to be satisfactory. This was obtained where a .015 inch thick diaphragm with a .019 inch thick spacer member 7 was employed.

The width and depth of the O-ring grooves 11, 12 has also been found to be critical with respect to prevention of cutting of the O-rings, and in one test assemblage a groove with a depth of .054 inch and a width of .082 inch for a 1/16 inch normal O-ring proved to be satisfactory.

Such design of O-ring compression and groove width limits the degree of rolling action of the O-rings and prevents their being cut or extruded during radialwise movement of the outer edge of the diaphragm 1. In tests where no seal lubricant was employed, over 500 hours of continuous operation without damage to either O-rings or diaphragm has been obtained.

The diaphragm 1 per se may be of a metal having the necessary flexibility and strength properties commensurate with the type of service. In being subjected to a corrosive liquid or gas, stainless steel is preferable, and, in order to take advantage of the size reduction, a type 301 stainless steel, having an endurance limit stress of 90,000 p.s.i., has been employed in the aforementioned test assemblage.

In accord with an additional feature of the invention, the inner casing walls 13, 14 enclosing chambers 5, 6 are shaped to conform to the natural attitude of the diaphragm 1 when deflected to its maximum permissible extent. By virtue of such arrangement, stress concentrations which otherwise might exist are eliminated and clearance between casing wall and diaphragm when fully deflected is kept to a minimum. This latter feature is extremely significant with respect to the volumetric efficiency which may be obtained when the novel diaphragm assemblage is employed in a compressor, such, for example, as that shown in FIGS. 2 and 3.

Where the novel diaphragm assemblage might be employed in a mechanism in which it is desired that the diaphragm 1 be actuated mechanically, a diaphragm follower assuming the inverse shape of the wall 13 or 14 may be employed to eliminate stress concentration during mechanically-induced diaphragm deflection. In this latter case the follower member would variably contact the diaphragm, increasingly from the center outward as such follower member deflects the diaphragm toward one of the complementary-shaped casing walls 13, 14.

In operation, in accord with the prime feature of the invention, as the diaphragm 1 is caused to deflect from its neutral position in which it is shown in FIGS. 1 and 2 toward one or the other of the walls 13, 14 (wall 13, for example) such diaphragm may be made to assume a deflected position such as shown in FIG. 3.

During such deflection, by virtue of the freedom afforded by the clearance between the diaphragm 1 at its outer annular edge and casing portions 2, 3 and by the resiliency of the O-ring seals 9, 10, such outer annular portion of diaphragm 1 will move radially inward between the O-ring seals.

This movement, in freeing the diaphragm from any rigid clamping at its outer edge, prevents the buildup of excessive stresses during the deflection, and assures a longer service life at greater degrees of deflection than heretofore possible with a diaphragm of this type.

Upon return of the diaphragm to its neutral position of FIGS. 1 and 2 under influence of its inherent elasticity or of externally applied force, its outer edge will move radially outward between the seals 9, 10.

During reversal in direction of deflection of diaphragm 1, i.e., toward wall 14, the same radialwise edge movement of the diaphragm occurs.

In the case of employment of the novel diaphragm assemblage in a compressor, as in FIGS. 2 and 3 for example, fluid (hydraulic, for example) under pressure may be alternately supplied to and released from chamber 5 via conduit means 15 under control of such as a spool valve 16 to cause deflection of the diaphragm alternately toward casing walls 13, 14 to cause compression of a gas alternately admitted into and displaced from chamber 6 via inlet and discharge check valves 17, 18, respectively.

Since the free-floating diaphragm assemblage affords a greater degree of deflection of the diaphragm 1 with less stress at its edges than heretofore possible with a rigidly clamped metal diaphragm, and since the deflection-conforming shape of casing walls 13, 14 affords deflection of the central portion of the diaphragm within bounds of the seals 9, 10 to positions in contact with such walls, it will be appreciated that fluid displacement with respect to flow into and out of chambers 5, 6 will correspond substantially to the volume of such chambers and accordingly the volumetric efficiency of such a compressor will be relatively high.

In actual practice a hydraulically-actuated compressor of the type shown in FIGS. 2 and 3, has been operated successfully at a speed of 240 cycles per minute at a gas inlet pressure of 7 atmospheres, a gas discharge pressure of 100 atmospheres, a compressed gas discharge rate of .25 standard cubic feet per minute, a hydraulic supply pressure of 1600 pounds per square inch, absolute, and a flow of .75 gallon per minute.

While the present invention has been described with a degree of particularity, it will be appreciated that the invention is not necessarily so limited except as defined in the following claims, where what is claimed is:

1. A diaphragm assemblage for displacing or compressing fluid comprising hollow casing means, a thin circular semirigid normally-flat flexible diaphragm member having a central portion disposed within said hollow casing means and cooperable with aligned concave interior walls thereof to define a fluid pressure chamber on at least one side and having an outer edge portion loosely fit with respect to said casing means for radialwise movement of such edge portion to permit greater freedom for increased deflection of said diaphragm, there being an unobstructed center clearance between said walls and said diaphragm member when in its relaxed nondeflected attitude at least three times the thickness of said diaphragm member, sealing means interposed between said edge portion and said casing means to prevent flow of fluid under pressure therepast while affording the necessary freedom for the aforesaid radialwise movement to permit freedom for diaphragm deflection alternately into contact with the aforesaid concave interior walls of said casing without overstressing said diaphragm.

2. A diaphragm assemblage for displacing or compressing fluid comprising hollow casing means, a thin normally-flat flexible diaphragm member having a central portion disposed within said hollow casing means and cooperable with an interior wall thereof to define a chamber and having an outer edge portion loosely fit with respect to said casing means to permit radialwise movement of such edge portion during deflection of the aforesaid central portion of said diaphragm toward and away from said interior wall, said interior wall being shaped to correspond to the natural shape assumed by such central portion of said diaphragm member upon maximum deflection and disposed with respect thereto to occupy an immediately adjacent contacting position when such central portion is so deflected, the center of said diaphragm member when in its non-deflected position being disposed away from said wall an unobstructed distance of at least three times the thickness of said diaphragm, valve means controlling alternate inlet and outlet flow of fluid to and from said chamber, and O-ring sealing means interposed between the aforesaid outer edge portion of said diaphragm member and said casing means to prevent flow of fluid under pressure therepast while affording freedom for the aforesaid radialwise movement thereby permitting deflection of said diaphragm into contact with the aforesaid interior wall of said casing.

3. In a diaphragm compressor the combination of hollow casing means, a thin normally flat flexible diaphragm having a central portion disposed within said hollow casing means in cooperation with oppositely-facing concave interior casing walls to define a pair of fluid pressure chambers at its opposite sides and having an outer edge portion movable radialwise during deflection of said central portion with respect to said casing walls, said casing walls being disposed apart a distance at least as great as seven times the thickness of said diaphragm and shaped to permit contact of said central portion for continuous support thereof when deflected to its maximum extent in the respective directions without causing stress concentrations in such portion, and yieldable sealing means compressed between said casing and the aforesaid outer edge portion of said diaphragm to act as a fluid pressure tight seal therebetween while affording the aforesaid radialwise movement of such outer edge portion to permit freedom for diaphragm deflection into contact with such walls without undue diaphragm stress.

References Cited in the file of this patent
UNITED STATES PATENTS

| | | |
|---|---|---|
| 1,101,266 | Franklin | June 23, 1914 |
| 2,662,478 | Surre | Dec. 15, 1953 |
| 2,751,530 | Armstrong | June 19, 1956 |
| 2,913,007 | Morrison | Nov. 17, 1959 |